United States Patent [19]

Naruse

[11] Patent Number: 4,542,489

[45] Date of Patent: Sep. 17, 1985

[54] OBJECT DETECTING SYSTEM OF REFLECTION TYPE

[75] Inventor: Yoshihiro Naruse, Tokyo, Japan

[73] Assignee: Aisin Seiki Kabushiki Kaisha, Japan

[21] Appl. No.: 495,910

[22] Filed: May 18, 1983

[30] Foreign Application Priority Data

May 18, 1982 [JP] Japan .................................. 57-83717
Jun. 11, 1982 [JP] Japan ................................. 57-100248

[51] Int. Cl.$^4$ ............................................. G08B 13/16
[52] U.S. Cl. ....................................... 367/93; 340/516
[58] Field of Search ........................... 367/93; 340/516

[56] References Cited

U.S. PATENT DOCUMENTS 3,928,849 12/1975 Schwarz .............................. 340/516
4,459,689 7/1984 Biber ...................................... 367/93
4,482,889 11/1984 Tsuda et al. ........................... 367/93

Primary Examiner—Glen R. Swann, III

Attorney, Agent, or Firm—Sughrue, Mion, Zinn, Macpeak, and Seas

[57] ABSTRACT

Ultrasonic waves are utilized to detect the presence of obstacles and to measure the distance between the system and the obstacle. Sensitivity for detecting obstacles is made variable in a manner that a range of the obstacle detecting distance is divided into plural distance regions and different detection sensitivities are set for the respective regions. The distance region to be detected is determined by a time period from generation of ultrasonic waves until reference to signal output made on the receiving side. For a predetermined period of time after generation of ultrasonic waves and for a predetermined period of time after completion of the reference timing to the received output, object discrimination is inhibited thereby to eliminate influences due to direct waves, secondary reflected waves, etc.

Immediately after emission of ultrasonic waves, the received output is referred to check the state of the system. If direct waves are not detected, this means that the system operates abnormally.

20 Claims, 10 Drawing Figures

OBJECT DETECTING SYSTEM OF REFLECTION TYPE

BACKGROUND OF THE INVENTION

This invention relates to an object detecting system of the reflecting type which utilizes ultrasonic waves, and more particularly to an object detecting system adapted to detect objects relatively near the system as well as those relatively far therefrom.

In motor vehicles, for example, there is known an object detecting system as a system for detecting obstacles locating out of a visual field of the driver and for guiding him. The object detecting system of this kind generally utilizes ultrasonic waves. More specifically, in this kind system ultrasonic waves of the given strength are emitted from a ultrasonic transmitter in the predetermined direction, and a ultrasonic receiver is set in the same direction. The presence of reflected waves, i.e., the presence of obstacles is detected based on strength and timing of the signal which is generated in the ultrasonic receiver.

Heretofore, when detecting objects at a distance ranging from several cm to several m by utilizing ultrasonic waves, there have been encountered problems conflicting with each other in the near and far ranges. More specifically, ultrasonic waves are attenuated so much in a space, i.e., in the atmosphere into which they are emitted, and an attenuation amount of ultrasonic waves is largely changed depending on the distance. Therefore, when the energy of ultrasonic waves emitted from the ultrasonic transmitter is set high for permitting detection of objects in the far range, direct waves, secondary reflected waves, etc. are also detected when detecting objects in the near range, thus resulting in a fear that there may occur an error in detection of objects. On the other hand, when the energy of the emitted ultrasonic waves is set low for avoiding influences due to direct waves, secondary reflected waves, etc. in the near range detection, energy of the reflected waves becomes too small to detect objects in the far range. In particular, when direct waves are detected in the near range measurement, a time lag between the reflected waves from objects and the direct waves is very small, so that it is extremely difficult to discriminate one from another. In the past, therefore, such object detecting system was designed to have a property adapted for the near range detection or that adapted for the far range detection, and the system having either one property or the other was selected in accordance with the use.

But when the system is employed in motor vehicles for detecting obstacles, for example, it is required to detect the presence of objects in the near range with the vehicle running at a relatively low speed in such a case where the vehicle is driven to enter into a garage, and it is also required to detect the presence of objects located fairly far away with the vehicle running at a relatively high speed. The use of plural detecting systems to meet both such requirements will result in increased cost and will need a large space for mounting the systems.

Meanwhile, if there occurs an anomaly on the transmitter side and ultarsonic waves are not generated from the transmitter, no ultrasonic wave reach the receiver even with obstacles being in existence actually. In this case, therefore, the system makes a judgment that there exists no obstacle and provides the driver with erroneous information, thus causing the possibility of danger. For example, when the motor vehicle is driven backward while checking the presence or absence of obstacles by the use of detectors provided on the rear portion of the vehicle, the driver believes that no obstacle exists there, if any failure has been occurred in the system. Thus, in the event there actually exists some obstacle, the vehicle may collide against the obstacle. In the prior system, for this reason, it is necessary for the driver to place any optional object in front of the object detector, thereby to check whether the system operates normally or not. However, to make such a check is very troublesome.

SUMMARY OF THE INVENTION

A first object of this invention is to make it possible to detect objects located in both the near and far ranges by a single system, and at the same time to eliminate the possibility of erroneous detection due to influences caused by direct waves, secondary reflected waves, etc.

A second object of this invention is to automatically inform the driver of the occurrence of trouble, should such trouble be induced in the object detecting system itself.

To achieve the above-mentioned objects, according to this invention, at least one of an energized level of a driving means adapted to drive a ultrasonic generating means, a gain of an amplifying means adapted to amplify signals from a ultrasonic receiving means, and a discrimination level of an object discriminating means adapted to discriminate the presence or absence of objects in accordance with a level of signals output from the amplifying means is made variable, and this variable is preset in accordance with the distance up to the objects detected. With this, the object detection sensitivity is varied correspondingly, so it becomes possible to lower a level of direct waves resulting from the emitted ultrasonic waves less than a discrimination level of the object discriminating means and hence to prevent erroenous detection by setting the detection sensitivity at a lower degree when discriminating the presence or absence of objects in the near range, and also to detect the presence or absence of even small objects positively by setting the sensitivity at a higher degree when discriminating the presence or absence of objects in the far range. In case of measuring objects in the far range, since the sensitivity becomes high, the object discriminating means may issue output having such a level as to indicate the presence of objects due to the increased magnitude of direct waves. But in this case, a time period from transmitting of ultrasonic waves to receiving thereof is different largely between the reflected waves and direct waves, so that erroneous detection can be eliminated by making reference to such time period.

Also in case of measuring objects in the far range, the increased detection sensitivity causes such a possibility that reflected waves coming into the ultrasonic detector after plural reflections, i.e., secondary waves may be detected. In a preferred embodiment of this invention, therefore, a time window is set through which an output level of the object discriminating means is referred, and its timing is changed in accordance with the detection distance. By so doing, influences of such secondary waves can be eliminated, because secondary waves require a longer period of time than normal reflected waves until they reach the ultrasonic receiver.

In a preferred embodiment of this invention, output from the ultrasonic receiver is monitored at the timing in accordance with the distance between the ultrasonic transmitter and the ultrasonic receiver so as to detect the ultrasonic waves reaching the ultrasonic receiver directly from the ultrasonic transmitter through no obstacle and hence to check possible troubles in the system itself. In general, when ultrasonic waves are generated from the ultrasonic transmitter, a part of the generated ultrasonic waves reaches the ultrasonic receiver as a direct wave after reflection in the ultrasonic transmitter itself, through diffraction or by straight propagation thereof, even in case there exists no obstacle. Thus, it is possible to judge that direct waves have been properly received, i.e., whether both transmitting and receiving units are operated normally or not, by energizing the ultrasonic transmitter and by checking whether a given signal is generated or not at the predetermined receiving timing (of direct waves) in accordance with the space between the ultrasonic transmitter and the ultrasonic receiver. In such a manner, since ultrasonic waves are generated actually and operation of the system is judged to be normal when receiving the generated ultrasonic waves, the entire system including the ultrasonic transmitter as well as the ultrasonic receiver can be checked in its operation positively.

Intensity of direct waves reaching the ultrasonic receiver is almost constant because they are not reflected by obstacles. In still another preferred embodiment of this invention, therefore, a level used for judging whether direct waves have been received or not and a level of direct waves produced in the normal operation are preset close to each other at the time of check for operation of the system. This permits to detect occurrence of anomaly when a level of the received signal is lowered due to deterioration of the ultrasonic transmitter and receiver, etc., so that reduction in the measurement accuracy caused by changed of a signal level can be informed.

Other objects and features of the invention will become more apparent from a reading of the following description with reference to the drawings.

DESCRIPTION OF PREFERRED EMBODIMENTS

Figure 1:
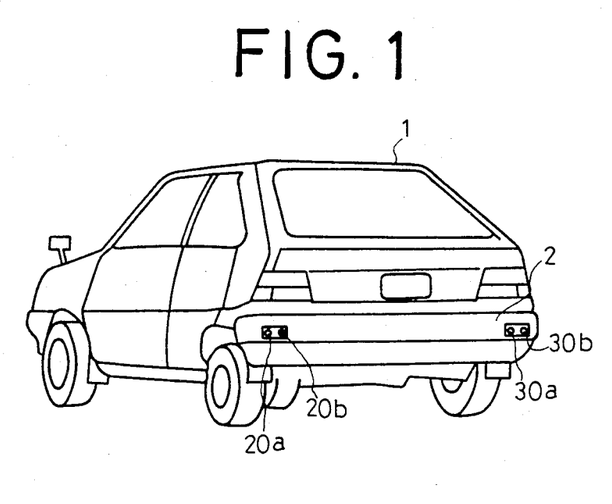
FIG. 1 is a perspective view of a motor vehicle equipped with an object detecting system of reflection type according to one embodiment of this invention.

FIG. 1 shows an external appearance of a motor vehicle equipped with an obstacle detecting system. Referring to FIG. 1, ultrasonic transmitters 20a, 30a and ultrasonic receivers 20b, 30b are mounted on both end portions of a rear bumper 2 of the motor vehicle 1. In the illustrated embodiment, one pair of the ultrasonic transmitter 20a and receiver 20b as well as the other pair of the ultrasonic transmitter 30a and receiver 30b are respectively disposed in parallel with each other by a distance of 3 cm therebetween. The ultrasonic transmitters 20a, 30a and the ultrasonic receivers 20b, 30b used in this embodiment are of ultrasonic ceramic microphones EFR-OSB40K2 and EFR-RSB40K2 made by Matsushita Electric Industrial Co., Ltd., respectively.

Figure 2:
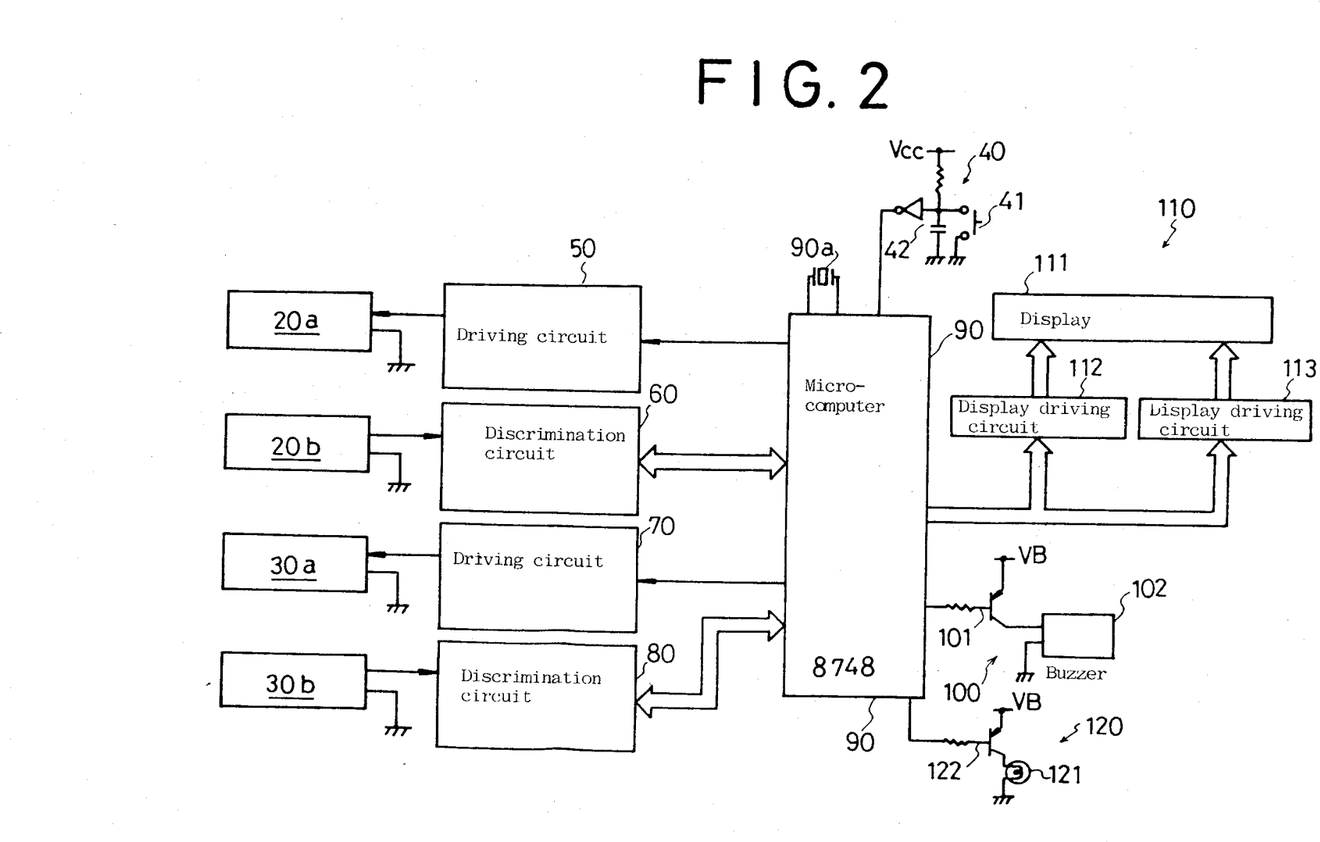
FIG. 2 is a block diagram of an electric circuit for the system loaded on the motor vehicle according to the embodiment shown in FIG. 1.

FIG. 2 shows a block diagram of an electric circuit for the obstacle detecting system loaded on the motor vehicle shown in FIG. 1. Now referring to FIG. 2, the ultrasonic transmitters 20a and 30a are respectively connected to output terminals of driving circuits 50 and 70, while the ultrasonic receivers 20b and 30b have output terminals respectively connected to discrimination circuits 60 and 80. The driving circuits 50 and 70 and the discrimination circuits 60 and 80 are connected to a microcomputer 90. The microcomputer 90 used in this embodiment is of a 8-bit singlechip microcomputer 8748 made by Intel Co., Ltd. Designated at the reference numeral 90a is a quartz oscillator for generating clock pulses which serve as a basis for operation of the microcomputer. The numeral 40 denotes a starting circuit which is composed of a starting switch 41 and a waveform shaping circuit 42. The starting switch 41 is a self-returning type and has a contact of normally open type. The starting switch 41 is disposed on an operation panel in front of the driver seat. The numeral 100 denotes a buzzer circuit which includes a buzzer 102 connected to an output port of the microcomputer 90 through a buzzer driving circuit 101. The numeral 110 denotes a distance indicating circuit adapted to display the distance between the motor vehicle and obstacles. The distance indicating circuit 110 is provided with a 3-digit 7-segment display 111. The display 111 is driven by a segment driving circuit 112 and a digit driving circuit 113 in a dynamic manner. The numeral 120 denotes an alarm circuit. An alarm lamp 121 lit up when the system malfunctions is connected to an output port of the microcomputer 90 through a lamp driving circuit 122.

Figure 3:
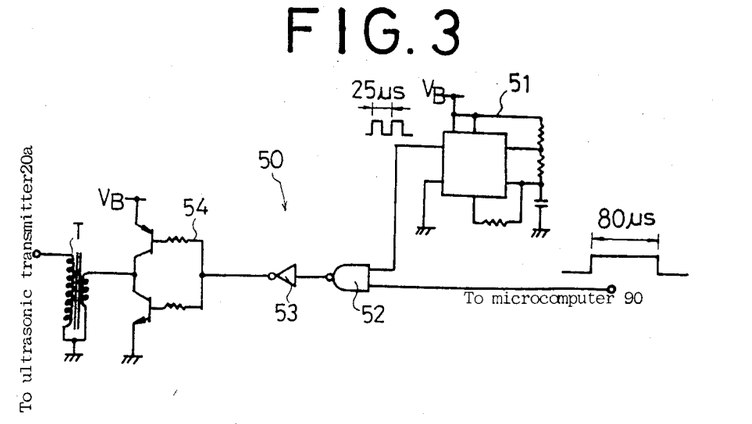
FIG. 3 is a block diagram showing a driving circuit 50 used in the circuit of FIG. 2.

FIG. 3 shows a concrete construction of the driving circuit 50 shown in FIG. 2. Since both the driving circuits 50 and 70 have the same construction in FIG. 2, description will be dispensed with as to construction of the driving circuit 70. Now referring to FIG. 3, designated at the reference numeral 51 is a pulse oscillator formed by using an integrated circuit, which outputs a pulse signal with the frequency of 40 KHz and the duty of 50% at all times. An output signal from the pulse oscillator 51 is applied through a NAND gate 52 and an inverter 53 to a power amplification circuit 54 composed of two transistors. The remaining input terminal of the NAND gate 52 is connected to an output port of the microcomputer. With an output level of this port assuming a high level H, the pulse signal from the pulse oscillator 51 appears at the output terminal of the NAND gate 52. Voltage Vb of 12 V is applied to the power amplification circuit 54 from a battery, so that a pulse signal with the amplitude of 12 V appears at the output terminal of the circuit 54. The output terminal of the power amplification circuit 54 is connected to the primary side of a boosting transformer T. When the pulse signal is applied to the primary side of the transformer T, there produces a signal with the amplitude of about 100 V on the secondary side thereof. Thus boosted signal of 40 KHz is applied to the ultrasonic transmitter 20a.

Figure 4:
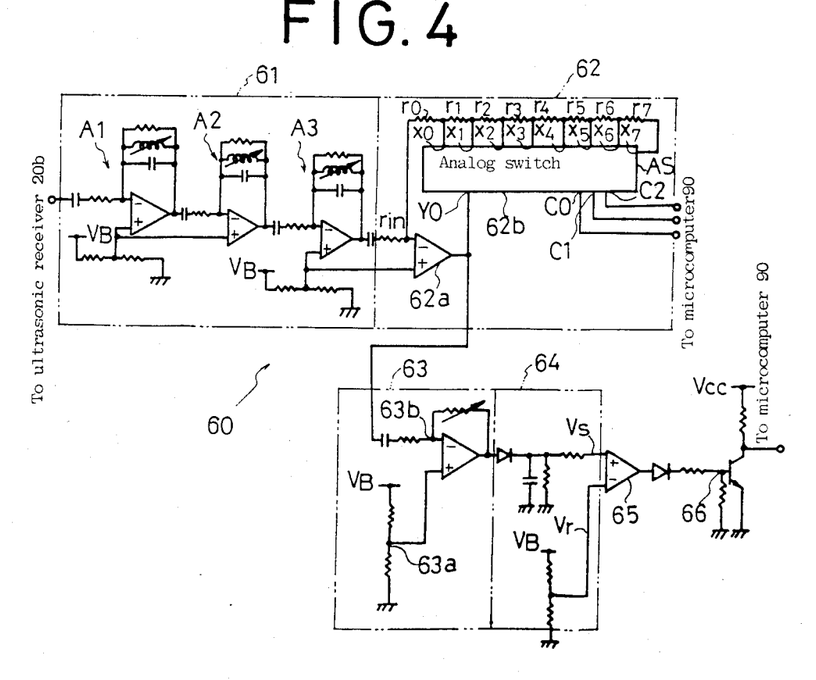
FIG. 4 is a block diagram showing a discrimination circuit 60 used in the circuit of FIG. 2.

FIG. 4 shows a concrete construction of the discrimination circuit 60 shown in FIG. 2. Since both the discrimination circuits 60 and 80 have the same construction, description of the discrimination circuit 80 will be dispensed with. Now referring to FIG. 4, the ultrasonic receiver 20b is connected to an amplification circuit 61 of the discrimination circuit 60. The amplification circuit 61 is composed of three steps of narrow band amplifiers A1, A2 and A3 which are cascade-connected. Each of the amplifiers A1, A2 and A3 is formed of an inverting amplifier comprising an operational amplifier, and a feedback path of each amplifier includes a parallel resonance circuit which is composed of a capacitor and an electric coil and which resonates at 40 KHz.

The reference numeral 62 denotes a variable gain amplifier. This variable gain amplifier 62 comprises an operational amplifier 62a, an analog switch (analog multiplexer) AS and a number of resistors. The analog switch AS used in this embodiment is of a CMOS MSI MC14051 made by Motorola Co., Ltd. The variable gain amplifier 62 will be now explained briefly. In this amplifier, those resistors which are selected in accordance with signals from the microcomputer 90 applied to 3-bit control input terminals C0, C1 and C2 of the analog switch AS, are connected to the operational amplifier 62a as feedback resistance, so that the signal is amplified with the gain which is determined by both feedback resistance and input resistance r in. In other words, assuming that the feedback resistance connected between the inverting input terminal and the output terminal of the operational amplifier 62a has the combined resistance of r t, a gain G of the amplifier 62 is represented by the following formula;

$$G = -r\,t/r\,in \quad (1)$$

As to analog switch AS, either one of its ports X0, X1, X2, X3, ..., X7 is selected by 3-bit gain setting signals applied to the control input terminals C0, C1 and C2, and the port thus selected is electrically connected to a common port Y0. For example, when data of the gain setting signals represents "0" with the input terminals C0, C1 and C2 assuming L, L and L, respectively, the port X0 is selected and the combined resistance r t assumes r0, so that the gain G is given by $-r0/r$ in. Likewise, when data of the gain setting signals represents "1", "2", "3", "4", "5", "6" or "7", the port X1, X2, X3, X4, X5, X6 or X7 is selected and hence the combined resistance r t is given by r0, r0+r1, r0+r1+r2, r0+r1+r2+r3, r0+r1+r2+r3+r4, r0+r1+r2+r3+r4+r5, r0+r1+r2+r3+r4+r5+r6, or r0+r1+r2+r3+r4+r5+r6+r7 correspondingly. In this way, the gain G of the variable gain amplifier 62 can be set in a range of 8 steps by the gain setting signals. In this embodiment, the maximum gain with data of the gain setting signals representing "7" is about 128 times as much as the minimum gain with data of the gain setting signals representing "0".

Designated at the reference numeral 63 is an inverting amplifier, 64 is a commutating/smoothing circuit and 65 is a comparator. The voltage Vb is divided by a resistor to obtain reference voltage Vr which is applied to one input terminal of the comparator 65, while DC voltage Vs obtained from the commutating/smoothing circuit 64 is applied to the other input terminal of the comparator 65. The reference numeral 66 denotes a level converting circuit, that is, an interface circuit, and its output terminal is connected to the microcomputer 90. Voltage Vcc has a level of 5 V.

Figure 5:
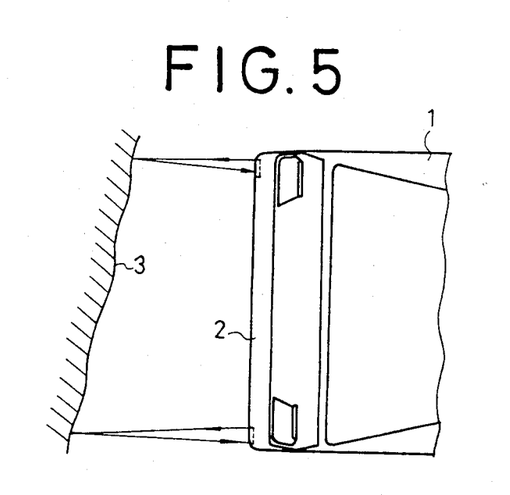
FIG. 5 is a plan view for schematically explaining operation of the system shown in FIG. 2.

Operation of the obstacle detecting system will be now described schematically. In this system, as shown in FIG. 5, ultrasonic waves are generated from both ends of the rear bumper 2 of the motor vehicle 1. When there exists an obstacle 3, the ultrasonic waves reflected by the obstacle 3 reaches the ultrasonic receivers and then are processed by the above-mentioned electric circuits to detect the presence of the obstacle.

In reflection type obstacle detection using ultrasonic waves, intensity of the reflected waves is largely different depending on the position of obstacles, whereby with the detection sensitivity being set too high, something other than obstacles may be detected as obstacles. Furthermore, there also exist the reflected waves which reach the receivers after repeating reflections in plural times. Should such reflected waves be detected and included in calculation of the distance, a large error may be resulted. In view of the above, according to this embodiment the region to be detected is divided into plural ones depending on an extent of the distance, and different sensitivities are imparted the respective regions. At the same time, a window of time is set to restrict a time period where detection of obstacles is effected. With these controls, high reliability can be assured. As to setting of detection sensitivities, data of the gain setting signals adapted to control the analog switch AS is varied thereby to attain the desired sensitivity. As to the time window, reference data is varied which is compared with the data counted by an interval timer within the microcomputer 90.

The following Table 1 shows a relationship among data Dg of the gain setting signals, data ΔTinh of reflected wave detection inhibiting term, and data Tgmax of completion time of detection, in the respective regions.

TABLE 1

| Gain Dg | ΔTinh | Tgmax |
| --- | --- | --- |
| 0 | 00H | 0FH (15) |
| 1 | 00H~0FH | 1EH (30) |
| 2 | 00H~1CH | 2CH (44) |
| 3 | 00H~2CH | 3BH (59) |
| 4 | 00H~3BH | 49H (73) |
| 5 | 00H~49H | 58H (88) |
| 6 | 00H~58H | 67H (103) |
| 7 | 00H~67H | 80H (128) |

In Table 1, the numerals affixed with the alphabet H are represented in hexadecimal notation. The numerals put in ( ) are based on decimal notation. The data shown in Table 1 is previously stored in a ROM (read only memory) within the microcomputer 90. Also, the value 1 included in both time data ΔTinh and Tgmax shown in Table 1 corresponds to a time period of 80 μs in this embodiment.

Figure 6A:
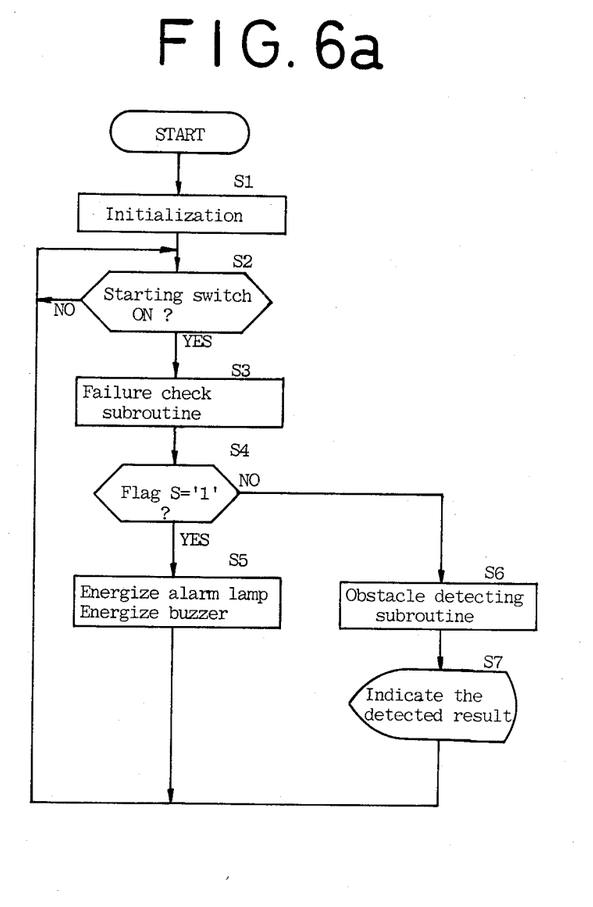
FIGS. 6a, 6b and 6c are flow charts showing operation of a microcomputer 90 shown in FIG. 2.
Figure 6B:
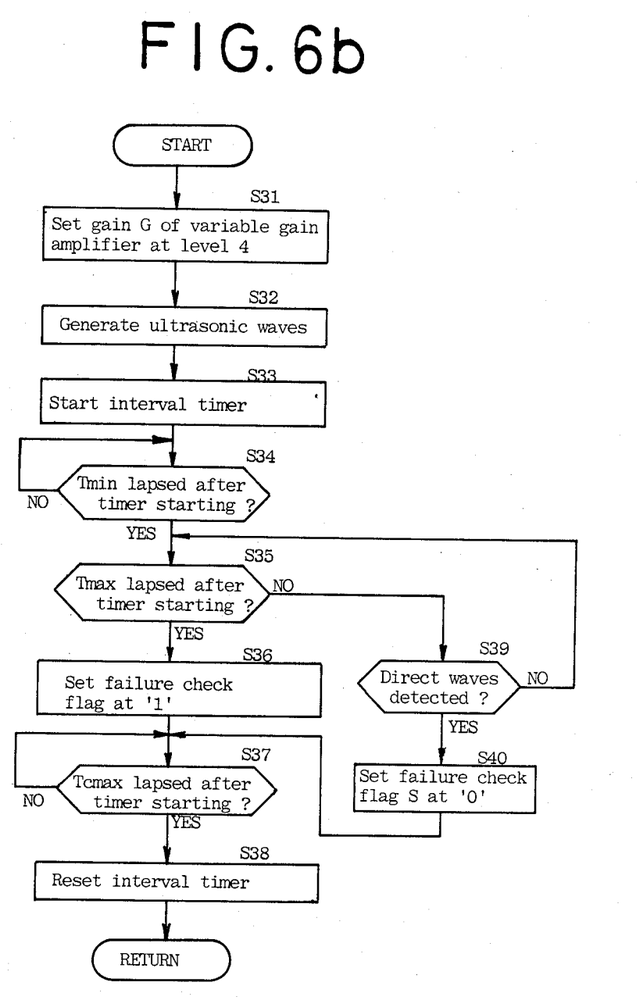
Figure 6C:
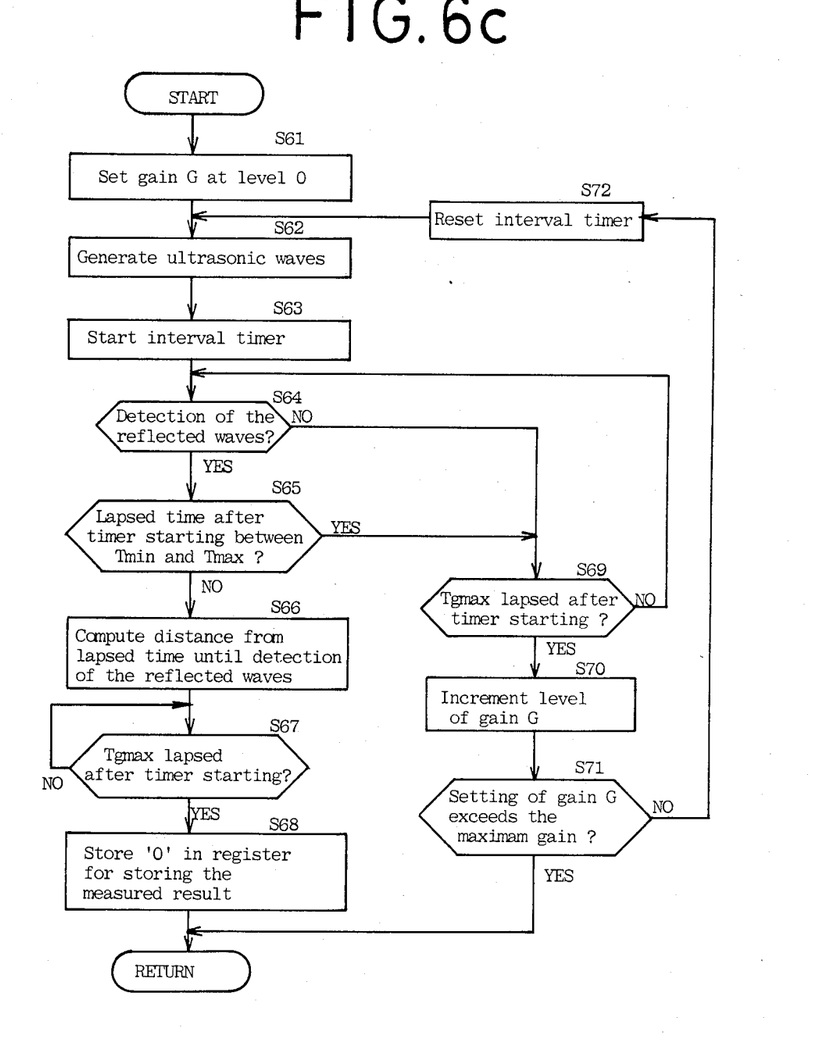

FIGS. 6a, 6b and 6c are flow charts showing operation of the microcomputer 90. FIG. 6a is a main routine, FIG. 6b is a subroutine for operation of failure detection processing shown in the main routine, and FIG. 6c is a subroutine for operation of obstacle detection processing shown in the main routine.

Operation of the microcomputer 90 will be now described schematically first by referring to FIG. 6a. Firstly, a step S1 is executed to effect initialization. With this, the predetermined data is written into a RAM (random access memory) within the microcomputer 90 and a level of each output port of the microcomputer is set at the initial level. More specifically, the ports for controlling energization of both driving circuits 50 and 60 are set at a low level L, the ports for energizing the alarm circuit 120 and the buzzer circuit 100 are set at a high level H, and the respective ports for energizing the distance indicating circuit 110 are set at a deenergized level.

Then, the microcomputer 90 executes a step S2 to check the state of the port to which is connected the starting circuit 40. This processing will be repeated until the port assumes such a level as indicating that the switch 41 has been actuated.

When the starting switch 41 is actuated, the microcomputer 90 executes a failure check subroutine in a step S3. Although this processing will be described later in detail, it is described here briefly. That is, ultrasonic waves are generated to check whether direct waves therefrom are detected by the ultrasonic receivers 20b and 30b. And the state of a flag S is set in accordance with the result of the check. The fact that such direct waves can be detected means that ultrasonic waves are transmitted assuredly and also that the ultrasonic receivers are operated normally. Thus, this check makes it possible to judge whether the entire system is normal or not. In the actual processing, when the system is operated normally, the flag S is set at "0", while if it is operated abnormally, i.e., if direct waves are not detected, the flag S is set at "1".

Subsequently, the microcomputer 90 executes a step S4 to check the state of the flag S which has resulted from the failure check routine in the previous step. The step to be executed thereafter is selected in accordance with the state checked.

That is, if the operation is abnormal, the microcomputer 90 shifts to a step S5 where the state of the output ports are set so as to energize the buzzer 102 and the alarm lamp 121.

On the other hand, when the operation is normal, the microcomputer 90 shifts to a step S6 to execute the obstacle detecting subroutine which will be explained later in detail. When an obstacle is detected in this processing, the distance between the motor vehicle and the obstacle is computed and the resulted value is stored in the predetermined register. When any obstacle is not detected, "0" is stored in that register.

In a step S7, the microcomputer 90 outputs the distance data attained through the obstacle detecting subroutine to both the display driving circuits 112 and 113, so that the distance between the motor vehicle and the obstacle is indicated in the form of 3-digit numerals.

Upon completion of the processing mentioned above, the flow returns back to the step S2 and the similar processing will be executed repeatedly.

The failure check subroutine will be now described in detail by referring to FIG. 6b. When the microcomputer 90 shifts to a step 31, the numeral 4 is output to the analog switch AS as gain setting signals. With this, the gain of the variable gain amplifier 62 is set at the predetermined level. This level is set in such a manner that when ultrasonic waves are emitted with operation of the obstacle detecting system being normal, a level of the signal Vs appearing at one input terminal of the comparator 65 resulted from the ultrasonic wave signal received by each of the ultrasonic receivers 20b and 30b becomes slightly higher than the reference voltage Vr, i.e., a threshold level.

Then, when the microcomputer 90 shifts to a step S32, the output port connected to the NAND gate 52 is set at a high level H for a predetermined period of time (80 μs in this embodiment). During this period, the pulse signal of 40 KHz from the pulse oscillator 51 appears at the output terminal of the NAND gate 52, so that the voltage of 40 KHz having the given level is applied to both the ultrasonic receivers 20a and 30a from the output terminal of the transformer T.

Thereafter, when the microcomputer 90 shifts to a step S33, a programmable interval timer built in the microcomputer (8748) is started.

In a step S34, the microcomputer 90 checks the time having lapsed after start-up of the interval timer, i.e., the time having lapsed after generation of ultrasonic waves, and then it waits for that the lapsed time gets up to Tmin, i.e., the minimum time period which allows such a judgment that direct waves have reached both the ultrasonic receivers 20b and 30b assuredly during such time period.

In a next step S35, the microcomputer 90 checks that the time having lapsed from start-up of the interval timer gets up to Tmax, i.e., the maximum time period which allows such a judgment that direct waves have reached both the ultrasonic receivers 20b and 30b assuredly during such time period. The processing to be executed subsequently is selected in accordance with the result of this check.

When the lapsed time locates between Tmax and Tmin, the microcomputer 90 shifts to a step 39. In this step, the state of the port connected to the output terminal of the level converting circuit 66 is read out, and it is checked whether the read-out state assuems a ultrasonic wave detection level or not, i.e., whether the relationship of Vs >Vr is met or not. When ultrasonic waves are not detected, the flow returns to the step S35 and the similar processing will be repeated until the lapsed time exceeds Tmax. When ultrasonic waves are detected, the flow comes to a next step S40.

In the step S40, the microcomputer 90 sets the failure check flag S at "0" and then shifts to a step S37.

If the lapsed time exceeds Tmax prior to detection of direct waves, the flow comes to a step S36 where the failure check flag S is set at "1".

Upon completion of those processings mentioned above, in the step S37 the microcomputer 90 waits for until the lapsed time exceeds Tcmax. This Tcmax is selected as a time period enough for that when ultrasonic waves emitted in the failure check subroutine is reflected by some object, the reflected waves become no influential in obstacle detection to be carried out following the failure check processing.

In a final step S38, the microcomputer 90 resets the interval timer and returns to the processing in the main routine.

The obstacle detecting subroutine will be now explained by referring to FIG. 6c. The microcomputer 90 first sets the gain setting signals at a level of "0" in a step 61 and hence sets the gain of the variable gain amplifier 62 at the lowest level of "0". Next, the flow comes to a step S62 where the microcomputer 90 outputs a high level H for 80 μs at the port connected to the NAND gate 52. With this, the pulse signal of 40 KHz from the pulse generator 51 appears at the output terminal of the NAND gate 52 during such period of a high level, whereby both the ultrasonic transmitters 20a and 30a are energized to emit ultrasonic wave signals of 40 KHz.

Then, the microcomputer 90 shifts to a step S63 to set start-up of the interval timer built therein.

In a next step S64, the microcomputer 90 reads out the state of the port connected to the output terminal of the level converting circuit 66 and then selects the step to be executed subsequently in accordance with the result read-out. When the state of the port assumes a low level L or a ultrasonic wave detection level, i.e., when the relationship of Vs>Vr is met, the flow comes to a step S65. On the other hand, when ultrasonic waves are not detected, the flow comes to a step S69.

Coming to the step S65 through detection of the reflected waves, the microcomputer 90 checks whether the time having lapsed after start-up of the interval timer, i.e., the time having lapsed after emission of ultrasonic waves locates between Tmax and Tmin or not. In this processing, the time periods Tmax and Tmin represent the maximum time and the minimum time set by the time data $\Delta$Tinh shown in Table 1, respectively. Stated differently, these time periods are such ones as where detection of the reflected waves is inhibited, in order to monitor only one of the aforesaid detection regions, that is, only one of regions divided into plural number in accordance with the distance between the ultrasonic transmitters 20a, 30a as well as the ultrasonic receivers 20b, 30b and obstacles. For instance, when a gain level (Dg) shown in Table 1 is set at 2, Tmax is 2400 $\mu$s corresponding to 1EH and Tmin is 0 $\mu$s corresponding to 00H. Then, the flow comes to a next step S69 so as to make detection of the reflected waves ineffective during such inhibited time period, even if the reflected waves be detected actually. When the reflected waves are detected during non-inhibited time period, the flow comes to a next step S66.

Shifting to the step S69, the microcomputer 90 makes a check whether the time having lapsed after start-up of the timer exceeds Tgmax or not. This Tgmax represents a time period set by the time data Tgmax shown in Table 1. The time period of Tgmax is selected as one enough for that ultrasonic waves emitted in the previous obstacle detection become no influential in the next obstacle detection. In case of the region, for example, where a gain level is set at 2, Tgmax assumes 3520 $\mu$s corresponding to 2CH. When the lapsed time does not exceed Tgmax, the flow returns to the step S64. When it exceeds Tgmax, the flow comes to a next step S70.

In the step S70, the microcomputer 90 updates setting of the gain and hence increments the gain level. For instance, when the gain level G has been set at 0, the G is now updated to 1.

In a next step S71, it is checked whether the gain level G set in the previous step S70 exceeds the maximum level, i.e., 7 or not. With the G being equal to or less than 7, the flow comes to a next step S72, while with the G being 8, the flow returns to the main routine. In the step S72, the microcomputer 90 resets the interval timer and then returns to the step S62.

When the reflected waves are detected after the lapsed time exceeds the detection inhibiting term (Tmin~Tmax), thus detected signal is processed in the step S66 as effective data. That is, a time period from emission of ultrasonic waves out of the ultrasonic transmitters 20a and 30 to detection of the reflected waves resulting from the emitted ultrasonic waves by the ultrasonic receivers 20b and 30b, is attained from the counted value of the interval timer, and thus attained time period and a speed of ultrasonic waves are used to calculate the distance between the motor vehicle and the obstacle. The resulted value is stored in the predetermined register.

In a next step S67, the microcomputer 90 waits for until the lapsed time exceeds Tgmax, and then shifts to a next step S68. In this step S68, the microcomputer 90 resets the interval timer and returns to the main routine.

In the embodiment stated above, although sensitivity of the obstacle detecting system is varied by changing the gain of the amplifier on the receiver side, the sensitivity may be varied by changing the reference voltage Vr of the comparator 65. Alternately, intensity of the emitted ultrasonic waves may be changed on the transmitter side to vary the sensitivity of the system.

Figure 7:
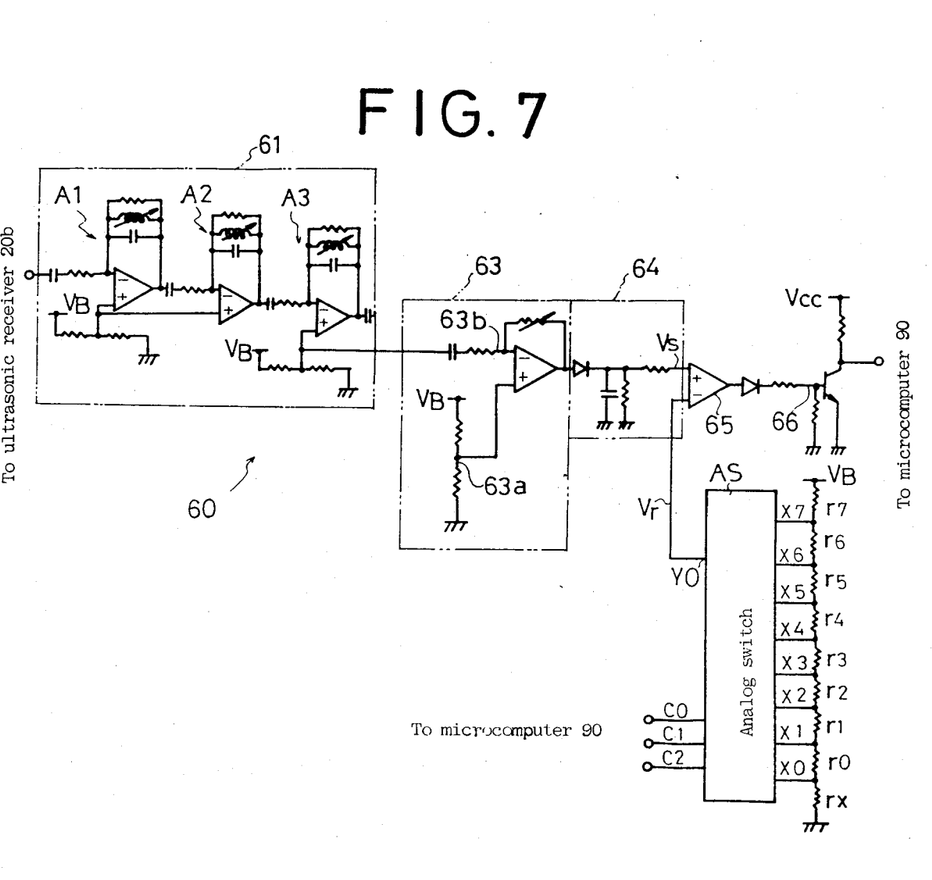
FIGS. 7 and 8 are block diagrams each showing a part of an electric circuit for the object detecting system according to another embodiment of this invention.

FIG. 7 shows one modified embodiment where the reference voltage Vr of the comparator is changed. Now referring to FIG. 7, the variable gain amplifier 62 shown in FIG. 3 is omitted and the common port Y0 of the analog switch AS is connected to one input terminal of the comparator 65 instead in this embodiment. Voltage Vb is divided by resistors rx, r0~r7 into different voltages which are applied to the ports X0 through X7 of the analog switch AS, respectively. Therefore, with the microcomputer being connected to the control input ports C0, C1 and C2, a level of the reference voltage Vr is varied by changing data output to these ports. This results in a change in sensitivity of the system, i.e., in a detection level which allows such a judgment based on the signals received by the ultrasonic detectors 20b and 30b that there exist the reflected waves.

Figure 8:
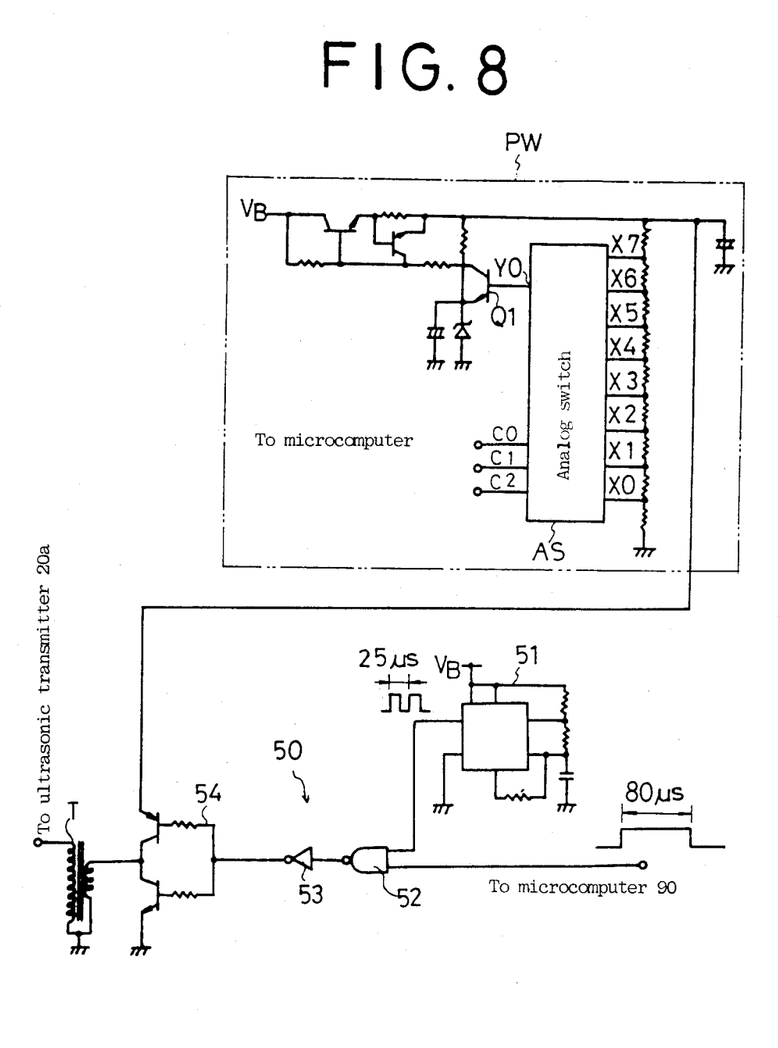

FIG. 8 shows another modified embodiment where intensity of the emitted ultrasonic waves is changed on the transmitter side. Now referring to FIG. 8, a level of voltage applied to the power amplification circuit 54 is varied to change intensity of the ultrasonic waves to be emitted in this embodiment. This voltage is produced by a power supply PW. The power supply PW is of a modified voltage-constant power supply unit of serial control type which is generally used. In other words, a level of voltage applied to a transistor Q1, i.e., an error amplifier is varied by the analog switch AS so as to change a level of output voltage from the power supply. More specifically, output voltage of the power supply PW is divided by a number of resistors into different voltages which are applied to the ports X0 through X7 of the analog switch As, respectively, so that a level of voltage applied to the error amplifier can be varied by changing data output to the control input ports C0, C1 and C2 of the analog switch AS. Accordingly, output voltage of the power supply can be also varied. Since a change in level of voltage output from the power supply PW leads to a change in amplitude of output pulses from the power amplification circuit 54, intensity of the emitted ultrasonic waves is varied correspondingly. This results in a change in intensity of the ultrasonic waves reaching the ultrasonic receivers, so that sensitivity for detecting obstacles is also varied.

In the above-mentioned embodiment two pairs of ultrasonic transmitters and receivers are mounted on the rear portion of motor vehicles, but those ultrasonic transmitters and receivers may be mounted on the side of motor vehicles. Alternately, there may be mounted, for example, on forks of forklift trucks to detect goods to be loaded or unloaded. In addition, the pair number of mounted ultrasonic transmitters and receivers may be set at one or three or more desirously.

Furthermore, although in the above-mentioned emboidment the driving circuits and the discrimination circuits are provided for the respective ultrasonic transmitters and receivers one to one, the number of the driving circuits and the discrimination circuits may each be reduced down to one at a minimum. When a plurality of ultrasonic receivers are connected to a single discrimination circuit, signals from the respective ultrasonic receivers are switched optionally using an analog switch, for example, so that any desirous one of those signals is connected to the discrimination circuit.

According to this invention as described in the above, it becomes possible to detect the presence of absence of objects in a wide area ranging from the near distance to the far distance. Also, should any failure be caused in the system, occurrence of such failure is informed to the operator immediately, thereby eliminating a fear that motor vehicles or so equipped with the present system may collide against obstacles.

Having now fully set forth both structure and operation of preferred embodiment of the concept underlying the present invention, various other embodiments as well as certain variations and modifications of the embodiment herein shown and described will obviously occur to those skilled in the art upon becoming familiar with the underlying concept. It is to be understood, therefore, that with the scope of the appended claims, the invention may be practiced otherwise than as specifically set forth herein.

What is claimed is:

1. An object detecting system of reflection type comprising:
    a ultrasonic wave generating means adapted to generate ultrasonic waves;
    a driving means adapted to drive said ultrasonic wave generating means;
    a ultrasonic wave receiving means adapted to receive ultrasonic waves and disposed a predetermined space from said ultrasonic wave generating means;
    an amplifying means adapted to amplify a signal from said ultrasonic wave receiving means;
    an object discriminating means adapted to generate a signal indicating the presence or absence of objects in accordance with a level of the signal obtained from said amplifying means; and
    an electronic control unit which energizes said driving means, which changes at least one of an energized level of said driving means, a gain of said amplifying means and a discrimination level of said object discriminating means, when said object discriminating means judges that there exists no object, and which calculates the distance in accordance with a time period from the energization of said driving means to judgement by said object discriminating means to indicate the presence of objects in response to a signal from said object discrimination means.

2. An object detecting system of reflection type according to claim 1, wherein said electronic control unit reads the signal from said object discriminating means during a certain period of time extending from a first predetermined time after energization of said driving means to a second predetermined time thereafter.

3. An object detecting system of reflection type according to claim 2, wherein said electronic control unit determines said first and second predetermined times in accordance with the setting of the energized level of said driving means 4. An object detecting system of the reflection type according to claim 2 wherein said electronic control unit determines said first and second predetermined times in accordance with the gain of said amplifying means.

5. An object detecting system of the reflection type according to claim 2 wherein said electronic control unit determines said first and second predetermined times in accordance with the discrimination level of said object discriminating means.

6. An object detecting system of reflection type according to claim 1, wherein said electronic control unit calculates the distance in accordance with a time period from the energization of said driving means to judgment by said object discriminating means to indicate the presence of objects, and then it displays the calculated distance when said object discriminating means judges that there exists some object.

7. An object detecting system of reflection type according to claim 1, wherein said driving means includes an analog multiplexer and a plurality of resistors.

8. An object detecting system of reflection type according to claim 1, wherein said amplifying means includes an analog muitiplexer and a plurality of resistors.

9. An object detecting system of reflection type according to claim 1, wherein said object discriminating means includes an analog multiplexer and a plurality of resistors.

10. An object detecting system of reflection type comprising:
    a ultrasonic wave generating means adapted to generate ultrasonic waves;
    a driving means adapted to drive said ultrasonic wave generating means;
    a ultrasonic wave receiving means adapted to receive ultrasonic waves and disposed a predetermined space from said ultrasonic wave generating means;
    an amplifying means adapted to amplify a signal from said ultrasonic wave receiving means;
    an object discriminating means adapted to discriminate the presence or absence of objects in accordance with a level of the signal obtained from said amplifying means; and
    an electronic control unit which energizes said driving means for a certain period of time and then reads a first signal from said object discriminating means at a predetermined timing in accordance with the distance between said ultrasonic wave receiving means, which judges the system to be abnormal when ultrasonic waves are not detected and again energizes said driving means when ultrasonic waves are detected, to change at least one of an energized level of said driving means, a gain of said amplifying means and a discrimination level of said object discriminating means, when said object discriminating means Judges that there exists no object, and which calculates the distance in accordance with a time period from the energization of said driving means to judgement by said object discriminating means to indicate the presence of objects, when said object discriminating means generates a second signal indicating that there exists some object.

11. An object detecting system of reflection type according to claim 10, wherein said electronic control unit issues an alarm when it judges the system to be abnormal.

12. An object detecting system of reflection type according to claim 10, wherein said electronic control unit sets the object detection sensitivity higher than the minimum level when energizing said driving means for said certain period of time and then referring to output from said object discriminating means at a predetermined timing in accordance with the distance between said ultrasonic wave generating means and said ultrasonic wave receiving means.

13. An object detecting system of reflection type according to claim 10, wherein said electronic control unit reads a second signal from said object discriminating means during a certain period of time extending from a first predetermined time after energization of said driving means to a second predetermined time thereafter, when there exists no anomaly.

14. An object detecting system of reflection type according to claim 13, wherein said electronic control unit determines said first and second predetermined times in accordance with the setting of the energized level of said driving means.

15. An object detecting system of the reflection type according to claim 13 wherein said electronic control unit determines said first and second predetermined time in accordance with the gain of said amplifying means.

16. An object detecting system of the reflection type according to claim 13 wherein said electronic control unit determines said first and second predetermined times in accordance with the discrimination level of said object discriminating means.

17. An object detecting system of reflection type according to claim 10, wherein said electronic control unit calculates the distance in accordance with a time period from the energization of said driving means to judgment by said object discriminating means to indicate the presence of objects, and then it displays the calculated distance, when said object discriminating means judges that there exists some object.

18. An object detecting system of reflection type according to claim 10, wherein said driving means includes an analog multiplexer and a plurality of resistors.

19. An object detecting system of reflection type according to claim 10, wherein said amplifying means includes an analog multiplexer and a plurality of resistors.

20. An object detecting system of reflection type according to claim 10, wherein said object discriminating means includes an analog multiplexer and a plurality of resistors.

* * * * *